United States Patent
Ghannam et al.

(10) Patent No.: US 10,407,014 B2
(45) Date of Patent: Sep. 10, 2019

(54) VEHICLE UNDERRIDE IMPACT DETECTION SYSTEMS AND METHODS

(71) Applicant: Ford Global Technologies, LLC, Dearborn, MI (US)

(72) Inventors: Mahmoud Yousef Ghannam, Canton, MI (US); Swadad A. Carremm, Canton, MI (US); Clara Bennie, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 189 days.

(21) Appl. No.: 15/591,967

(22) Filed: May 10, 2017

(65) Prior Publication Data
US 2018/0326936 A1  Nov. 15, 2018

(51) Int. Cl.
| | |
|---|---|
| *B60R 1/00* | (2006.01) |
| *B60R 21/0134* | (2006.01) |
| *G08G 1/16* | (2006.01) |
| *B62D 21/15* | (2006.01) |
| *B62D 63/08* | (2006.01) |
| *B60R 21/01* | (2006.01) |
| *B60R 21/00* | (2006.01) |
| *B60R 19/56* | (2006.01) |

(52) U.S. Cl.
CPC .......... *B60R 21/0134* (2013.01); *B60R 1/00* (2013.01); *B62D 21/15* (2013.01); *B62D 63/08* (2013.01); *G08G 1/162* (2013.01); *G08G 1/166* (2013.01); *B60R 19/56* (2013.01); *B60R 2021/002* (2013.01); *B60R 2021/01211* (2013.01); *B60R 2300/301* (2013.01); *B60R 2300/8093* (2013.01)

(58) Field of Classification Search
CPC ........ B60R 21/01; B60R 21/0134; G08G 1/16
See application file for complete search history.

(56) References Cited

U.S. PATENT DOCUMENTS

| 8,068,134 | B2 | 11/2011 | Yoshizawa | |
|---|---|---|---|---|
| 2003/0060972 | A1 | 3/2003 | Kakinami | |
| 2006/0162982 | A1 | 7/2006 | Lich | |
| 2009/0143986 | A1* | 6/2009 | Stein | G08G 1/16 701/301 |
| 2009/0259368 | A1* | 10/2009 | Hadi | B60R 21/0134 701/45 |
| 2015/0365810 | A1* | 12/2015 | Yamaguchi | G06Q 10/10 701/32.2 |
| 2016/0137195 | A1* | 5/2016 | Takahashi | G08G 1/166 701/41 |

(Continued)

FOREIGN PATENT DOCUMENTS

| DE | 102005022421 A1 | 10/2006 |
|---|---|---|
| JP | 2005297732 A | 10/2005 |

*Primary Examiner* — Anshul Sood
(74) *Attorney, Agent, or Firm* — Frank Lollo; Neal, Gerber & Eisenberg LLP; James P. Muraff

(57) ABSTRACT

Devices and methods are disclosed for detecting or predicting an underride impact. An example vehicle includes a camera for capturing an image of a target vehicle, sensors for detecting a speed and heading of the vehicle, and a processor. The processor is configured to determine a target vehicle classification, determine an open space of the target vehicle, determine a closing speed between the vehicle and target vehicle, predict an underride impact based on the classification, open space, and closing speed, and responsively execute an impact action.

20 Claims, 4 Drawing Sheets

(56) References Cited

U.S. PATENT DOCUMENTS

2016/0153778 A1     6/2016  Singh et al.
2016/0347310 A1*   12/2016  Moran ................... B60W 30/09
2018/0229680 A1*    8/2018  Fujinami ............. B60R 21/0132
2018/0304775 A1*   10/2018  Foltin ................... B60N 2/0276

* cited by examiner

VEHICLE UNDERRIDE IMPACT DETECTION SYSTEMS AND METHODS

TECHNICAL FIELD

The present disclosure generally relates to vehicle underride impact detection, more specifically, systems and methods for mitigating damage caused by a vehicle underride impact.

BACKGROUND

An underride impact, or "submarine" event often involves a passenger vehicle failing to stop, and crashing into a larger vehicle such as a semi trailer. The semi trailer often sits higher up, such that the bumper of the passenger vehicle avoids contact with the semi trailer and slides under the trailer. In these cases, the brunt of the impact is experienced by the upper portion of the passenger vehicle including the windshield, windshield frame, and even the upper body of the passengers.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle underride impact detection. An example disclosed vehicle includes a vehicle with a camera for capturing an image of a target vehicle, sensors for detecting a speed and heading of the vehicle, and a processor. The processor is configured to determine a target vehicle classification, determine an open space of the target vehicle, determine a closing speed between the vehicle and target vehicle, predict an underride impact based on the classification, open space, and closing speed, and responsively execute an impact action.

An example disclosed method includes capturing a target vehicle image with a camera of a vehicle. The method also includes detecting a speed and heading of the vehicle. The method also includes determining a target vehicle classification, and determining an open space of the target vehicle. The method further includes determining a closing speed between the vehicle and the target vehicle. The method further includes predicting an underride impact based on the classification, open space, and closing speed, and responsively executing an impact action.

A third example may include means for capturing a target vehicle image with a camera of a vehicle, means for detecting a speed and heading of the vehicle, means for determining a target vehicle classification, means for determining an open space of the target vehicle; means for determining a closing speed between the vehicle and the target vehicle, means for predicting an underride impact based on the classification, open space, and closing speed, and means for responsively executing an impact action.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
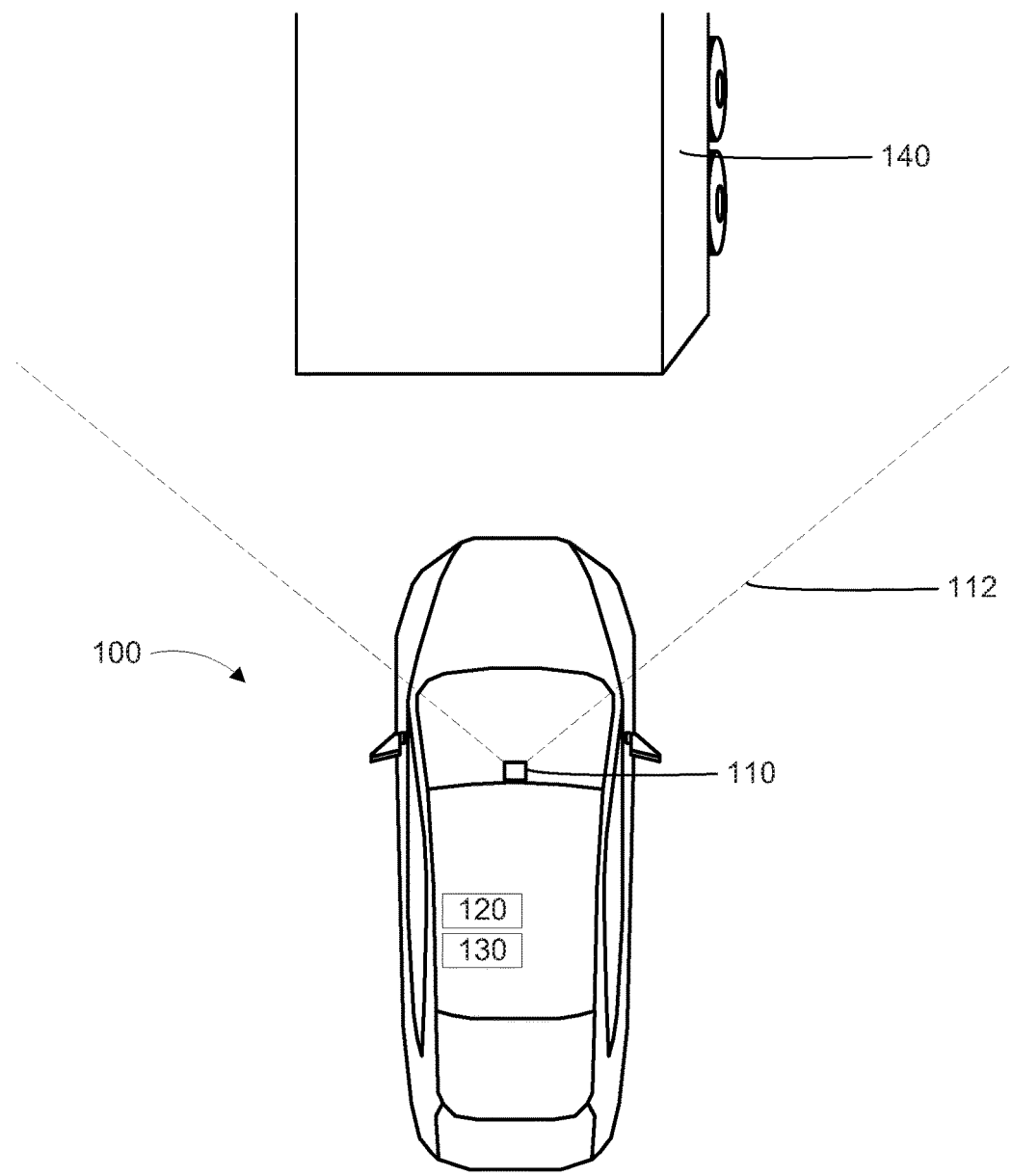
FIG. 1 illustrates an example scenario involving a vehicle and a target vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, embodiments herein are directed to underride impact detection and mitigation. Some of the most dangerous vehicle crashes include a smaller vehicle crashing into a larger vehicle, where the smaller vehicle ends up underneath the larger vehicle. Typical vehicle protection mechanisms (airbags, restraints, etc.) may be designed around or configured to operate most effectively when the vehicle crashes into a wall, road obstruction, or other object where the bumper of the vehicle makes the first contact. Underride impacts, however, often involve an object with a significant ground clearance, such that a bumper of a smaller vehicle will not make the first impact. Instead, the windshield or other upper portion of the car will make the first impact. As a result, a crash sensor in the bumper may not detect the impact early enough to activate one or more safety measures.

Some large vehicles, such as semi trailers, may include one or more protection beams, blocker beams, or other structural protective elements that hang below the trailer to attempt to prevent underride impacts. But many large vehicles do not include these protective elements, and regulations requiring protective elements may vary from state to state or country to country. Further, some protective elements may be removable or adjustable, and a driver may forget to re-attach or return the protective elements to the appropriate position. Still further, some protective elements may not be strong enough to prevent an underride impact, even where they are included.

Embodiments of the present disclosure are directed to methods and systems for detecting an underride impact, providing a warning to the driver of the vehicle, and taking an appropriate action regarding safety measures. Example embodiments may enable increased safety performance, may mitigate damage cause by underride impacts, and may provide additional safety measures.

An example vehicle may include a vehicle with a camera for capturing a target vehicle. The camera may be a front facing camera, and may be mounted to a rear-view mirror of the vehicle. The target vehicle may be a truck, semi trailer, or other object in front of the vehicle. The example system may also include one or more sensors configured to detect a speed and heading of the vehicle. The speed and heading of the vehicle may be used to determine whether an object in front of the vehicle is a target vehicle. For example, a vehicle may be in a first lane of a road, and a semi trailer may be in a second lane. The speed and heading of the vehicle may indicate that the vehicle is veering into the second lane. The vehicle may then determine from that information that the semi-trailer in the second lane will be in a path of the vehicle. The semi-trailer may then be selected as a target vehicle.

The example system may then include a processor configured to received the vehicle and sensor data, and carry out several functions. The processor may determine a target vehicle classification. Classifications may include small or large vehicles. Small vehicles may include passenger cars, sport utility vehicles (SUVs), pickup trucks, and other vehicles for which an impact will not likely be an underride impact. Large vehicles may include Semi trailers, large trucks, busses, and other vehicles for which an impact will likely be an underride impact. For some classifications, the system may conclude that an underride impact is not likely to occur even if there is a crash. For instance, where the target vehicle is a sedan, classified as a small vehicle. Alternatively, the system may determine that the target vehicle is a semi trailer, classified as a large vehicle, and determine that should a crash occur, there may be an underride impact.

The processor may also be configured to determine the open spaces of the target vehicle. The open spaces may include areas of the target vehicle underneath the sides, between the ground and a lower portion, between the tires, underneath an overhanging part of the target vehicle, and more. In particular examples, the open spaces of the target vehicle may include areas which may ordinarily be protected by underride guards.

Further, the processor may be configured determine a closing speed between the vehicle and the target vehicle. This information may be determined based on one or more sensors, including RADAR, light imaging detection and ranging (LIDAR), or from one or more images captured by the camera. The closing speed may be determined by comparing the detected speed and heading of the vehicle with a sensed speed and direction of the target vehicle.

The processor may then be configured to predict an underride impact based on the determined classification, the determined open space, and the determined closing speed. Each of the classification, open space, and closing speed may be used to determine or predict a likelihood of an underride impact between the vehicle and the target vehicle. Other metrics may be used as well.

Where an underride impact is predicted, an appropriate action may be taken. For instance, a vehicle display may show a driver of the vehicle an alert indicating that an impact is imminent. In some examples, the display may show a likelihood of impact, such that as the vehicle gets closer to the target vehicle the likelihood increase. In this manner, the display may alert a user to how safe he or she is driving, and may indicate a safe distance at which to follow the target vehicle.

In some examples, the system may transmit a vehicle-to-vehicle signal to the target vehicle. The signal may indicate the likelihood of an underride impact, that an underride impact is predicted, and/or that an underride guard of the target vehicle is not in place. Further, the system may transmit a signal to one or more other parties, such as nearby vehicles, an emergency response vehicle, a remote computing device, or others, which may apprise the parties of the likelihood of impact, predicted impact, or other information.

In some examples, the system may modify a collision system of the vehicle. For example, the vehicle may ordinarily make us of a crash sensor on or near a bumper of the vehicle that activates one or more features of the restraint control module (RCM). The system may modify the collision system so that images captured by the camera may activate the features of the RCM. In this way, even where the crash sensor in the bumper does not detect an impact, the camera may be used to indicate an impact is imminent and to activate the airbags, seatbelts, or other protective measures.

FIG. 1 illustrates an example scenario involving a vehicle 100 according embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include a camera 110, communicatively coupled to a control system 120. Camera 110 may be configured to capture images of the surroundings to be processed by a processor of control system 120, and/or displayed on a display of vehicle 100, which may include a center console display, an instrument panel display, a display on a vehicle rear-view mirror, a hand held device display, or some other display. Vehicle 100 may also include one or more sensors 130, configured to detect one or more characteristics of vehicle 100 and/or target vehicle 140.

Camera 110 may have a field of view 112. The field of view may be narrow, wide, and/or may be configured to focus on a limited range in front of vehicle 100. Camera 110 may thus be enabled to capture images of target vehicle 140, when target vehicle 140 is directly in front of vehicle 100 (as shown in FIG. 1), as well as when target vehicle 140 is off to a side of vehicle 100, such as may be the case when target vehicle 140 is in a different lane, is travelling in a different direction (e.g., travelling perpendicular to the direction of vehicle 100 at a cross section), or is otherwise within a range of vehicle 100. Field of view 112 may be selected such that it is wide enough to encompass the full possible paths that vehicle 100 may take, based on a speed and turning radius of vehicle 100.

Control system 120 may include one or more processors, memory, and other components configured to carry out one or more functions, acts, steps, blocks, or methods described herein. Control system 120 may be separate from or integrated with one or more other systems of vehicle 100.

Sensors 130 may include accelerometers, gyroscopes, wheel speed sensors, torque sensors, RADAR, LIDAR, and/or one or more other sensors configured to detect various metrics regarding vehicle 100 and target vehicle 140. Target vehicle 140 may be a small vehicle (e.g., a sedan, coupe, etc.) or may be a large vehicle (e.g., a truck, semi trailer, etc.).

Figure 2:
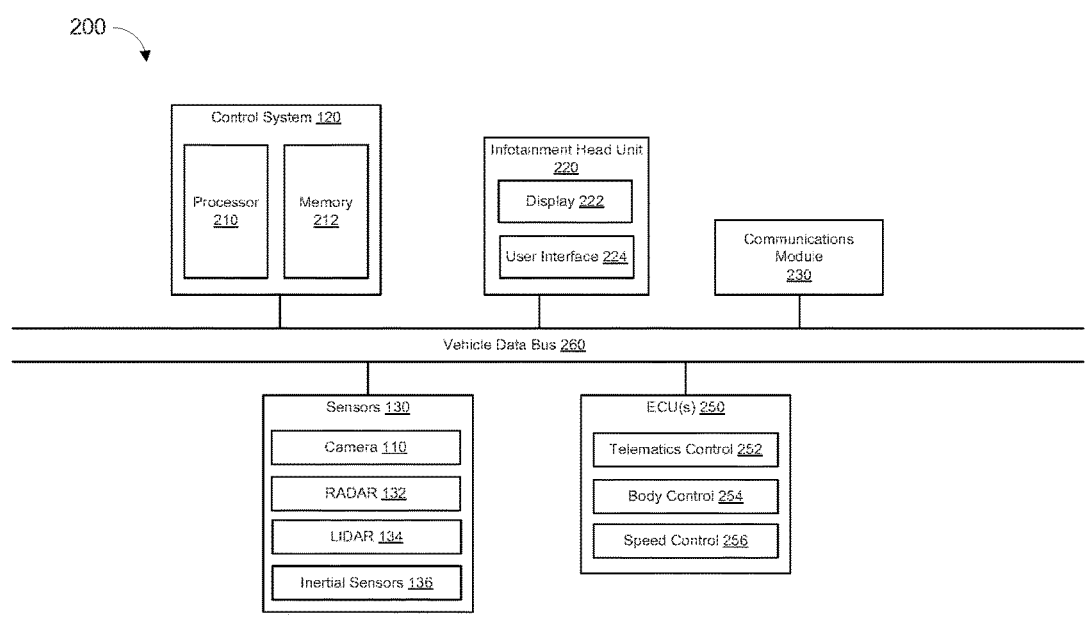
FIG. 2 illustrates an example block diagram of electronic components of the vehicle of FIG. 1.

FIG. 2 illustrates an example block diagram 200 showing electronic components of vehicle 100, according to some embodiments. In the illustrated example, the electronic components 200 include the control system 120, infotainment head unit 220, communications module 230, sensors 130, electronic control unit(s) 250, and vehicle data bus 260.

The control system 120 may include a microcontroller unit, controller or processor 210 and memory 212. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor with control system 120. Additionally, the infotainment head unit 220 may display the infotainment system on, for example, a center console display of vehicle 100.

Communications module 230 may include wired or wireless network interfaces to enable communication with the external networks. Communications module 230 may also include hardware (e.g., processors, memory, storage, etc.) and software to control the wired or wireless network interfaces. In the illustrated example, communications module 230 may include a Bluetooth module, a GPS receiver, a dedicated short range communication (DSRC) module, a WLAN module, and/or a cellular modem, all electrically coupled to one or more respective antennas.

The cellular modem may include controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); and Wireless Gigabit (IEEE 802.11ad), etc.). The WLAN module may include one or more controllers for wireless local area networks such as a Wi-FI® controller (including IEEE 802.11 a/b/g/n/ac or others), a Bluetooth® controller (based on the Bluetooth® Core Specification maintained by the Bluetooth Special Interest Group), and/or a ZigBee® controller (IEEE 802.15.4), and/or a Near Field Communication (NFC) controller, etc. Further, the internal and/or external network(s) may be public networks, such as the Internet; a private network, such as an intranet; or combinations thereof, and may utilize a variety of networking protocols now available or later developed including, but not limited to, TCP/IP-based networking protocols.

Communications module 230 may also include a wired or wireless interface to enable direct communication with an electronic device (such as a smart phone, a tablet computer, a laptop, etc.). An example DSRC module may include radio(s) and software to broadcast messages and to establish direct connections between vehicles. DSRC is a wireless communication protocol or system, mainly meant for transportation, operating in a 5.9 GHz spectrum band.

Sensors 130 may be arranged in and around the vehicle 100 in any suitable fashion. In the illustrated example, sensors 130 include camera 110, RADAR 132, LIDAR 134, and one or more inertial sensors 136. Either or both of RADAR 132 and LIDAR 134 may be used to determine a speed and heading of a target vehicle such as target vehicle 140, and/or a closing speed between two vehicle.

Inertial sensors 136 may be configured to detect a speed and heading of vehicle 100. Inertial sensors 136 may include one or more accelerometers, gyroscopes, wheel speed sensors, or more. The speed and heading of vehicle 100 may be used to determine which vehicle in the field of view 112 of camera 110 is the target vehicle. For instance, where multiple vehicles are included in the camera field of view, the speed and heading of vehicle 100 may be used to select which of the multiple vehicles is the target vehicle.

Further, the speed and heading of vehicle 100 may be used to determine a closing speed between vehicle 100 and a target vehicle, as well as to determine or predict a likelihood of a crash or underride impact occurring.

Other sensors are possible as well, and each sensor may be electrically coupled to control system 120, such that information can be transmitted and received.

The ECUs 250 may monitor and control subsystems of vehicle 100. ECUs 250 may communicate and exchange information via vehicle data bus 260. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module 230, and/or one or more sensors 130. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the control system 120, infotainment head unit 220, communications module 230, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3A:
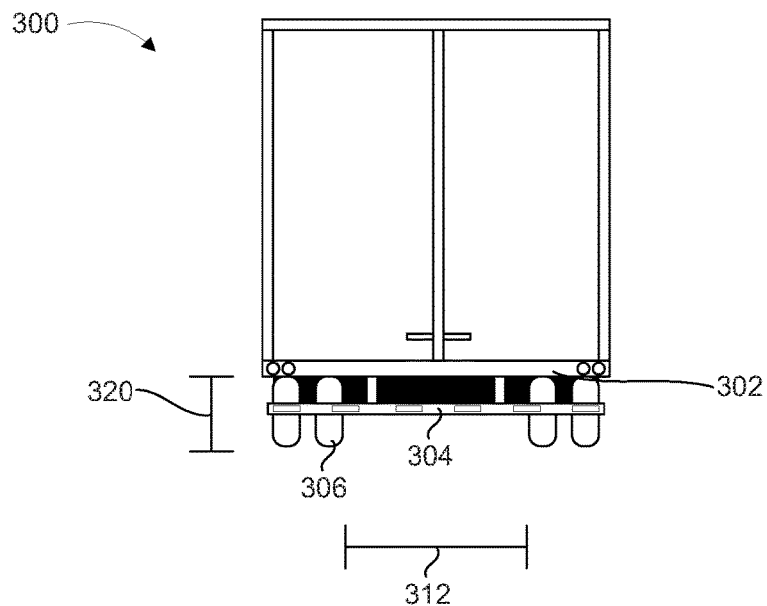
FIGS. 3A and 3B illustrate rear and side views respectively of an example target vehicle according to embodiments of the present disclosure.
Figure 3B:
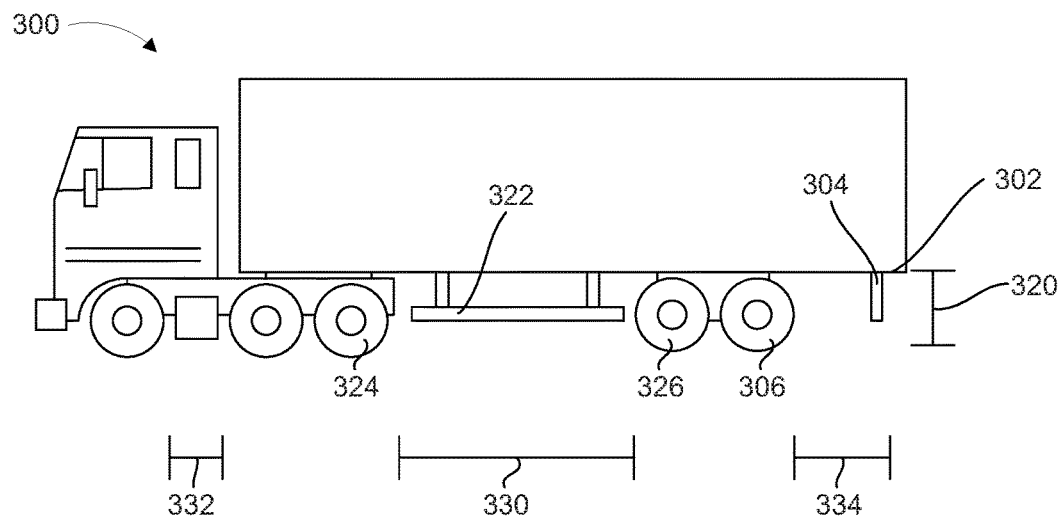

FIGS. 3A and 3B illustrate rear and side views of an example target vehicle 300. As discussed above, the vehicle may include a camera for capturing a target vehicle. The camera may be coupled to a rear-view mirror of the vehicle, such that it can capture a wide field of view in front of the vehicle. Alternatively, the camera may be mounted on a dashboard, or integrated with one or more components of the vehicle.

Based on images captured from the camera, a processor such as processor 210 may be configured to determine the target vehicle classification. The classification may be based on a size and/or shape of vehicle, and may be determined by recognizing or detecting features or markers on the target vehicle (e.g., lights, reflective patches, etc.). The step of classification may thus include applying image processing techniques to images captured by the camera.

In some examples, the classification of the target vehicle may be such that the target vehicle is put into one of several categories. For instance, the target vehicle may be a large or small vehicle. Further, the classification may include more specific information such as the make and/or model of the vehicle. The classification may also include determining whether an impact between the vehicle and the target vehicle may include an underride impact, and basing a classification based on this determination. As such, target vehicle may be classified as either (1) vehicles for which an underride impact is possible, or (2) vehicles for which an underride impact is not possible.

The processor may also be configured to determine one or more open spaces of the target vehicle. The open spaces may be determined based on images captured by the camera, and may refer generally to areas of the target vehicle for which an underride impact may occur. For instance, the open space may be bounded by one or more components of the target vehicle (such as wheels, side panels, a truck bed), such that if a vehicle impacts the target vehicle in the target vehicle open space, an underride impact may occur.

FIG. 3A illustrates a rear view of a target vehicle 300, including a lower edge 302, a rear underride guard 304, and wheels 306. FIG. 3A also illustrates a distance 320 between the lower edge 302 and the ground, and a distance 312 between the rear tires of target vehicle 300. The open space may be bounded by one or more components of target vehicle 300, such that the open space includes a rectangular area of width 312 and height 320. In some examples, the open space may be a non-rectangular shape.

FIG. 3B illustrates a side view of target vehicle 300. In FIG. 3B, target vehicle 300 may include a side underride guard 322. Further, there may be a distance 332, 330, and 334 which may bound the open space. As such, FIG. 3B illustrates that there may be several open spaces, including an area of width 332 and height 320, width 330 and height 320, and width 334 and height 320. These distances are shown as examples only, and it should be understood that other target vehicle shapes, sizes, and geometries will have different open spaces.

In some examples, the images from the camera may be analyzed and processed to determine the open spaces. For instance, an image captured corresponding to FIG. 3B may be processed and features of target vehicle 300 may be determined, including the wheels 306, 324, and 326, underride guards 304 and 322, top, bottom, and sides of the target vehicle, as well as distances between various features. Open spaces may be determined based on this information.

The processor 210 may also be configured to determine a distance and closing speed between the vehicle (i.e., vehicle 100) and the target vehicle (i.e., target vehicle 140 and/or 300). In some examples, the distance and closing speed may be determined based on one or more vehicle sensors 130, such as RADAR, LIDAR, or via images captured by camera 110. The RADAR and/or LIDAR may bounce signals off the target vehicle to determine a distance, and over time the change in distance may provide the closing speed. Alternatively, images from the camera may be used to determine the distance and closing speed. In this case, pixel ratio analysis may be used.

In some examples, the processor may determine a speed and heading of the target vehicle 140 or 300, and compare to the speed and heading of vehicle 100. The closing speed may then be responsively determined.

The closing speed may be used, in combination with various other vehicle metrics such as speed, weight, brake time, etc., to determine whether vehicle 100 will have enough time to stop and avoid a collision with target vehicle 140 or 300.

Processor 210 may then be configured to predict an underride impact. The prediction may be based on the target vehicle classification, the determined open space(s), and the determined closing speed. The prediction may take the form of a yes/no prediction, or may be a likelihood, numeric, or percentage value. The prediction may also change over time. For instance, where the target vehicle is far away, the prediction may be low, but as the distance between the vehicle and the target vehicle decreases, the prediction may increase.

The classification may affect the prediction in that where a small vehicle is detected, there may be no underride impact predicted. Alternatively, where the target vehicle is a large vehicle, the prediction, likelihood, or possibility of an underride impact may increase. The open spaces may affect the prediction in that the determination of a larger open space may increase the likelihood of an underride impact. But where the open space is small, the likelihood may be small. Further, the closing speed and distance between the vehicle and target vehicle may affect the prediction in that a greater closing speed and/or smaller distance may increase the likelihood of an underride impact.

The processor may also be configured to determine one or more characteristics of vehicle 100, such as a size and shape. The size and shape may be used in the prediction of an underride impact. For instance, where vehicle 100 is an SUV, vehicle 100 may have a higher front end than a small car. Then, supposing the same sized open space for a target vehicle in front of both the SUV and the smaller car, an underride impact for the SUV may be deemed less likely than an underride impact for the small car. This may be due to the relative sizes of the vehicle 100 and the target vehicle open space. The vehicle 100 characteristics used for this purpose may include height from the ground to the bumper, ground to windshield, ground to passenger head height, length from front bumper to windshield, length from front bumper to passenger head, width of front end, and many more.

Where an underride impact is predicted, processor 210 may responsively execute an impact action. In some examples, the action may include alerting a driver of the vehicle. This may include a visual alert (e.g., on a vehicle display such as display 222) or an audio alert (e.g., beeping, a siren, or another noise). In some examples, the alert may include monitoring the distance between the vehicle and target vehicle as well as the likelihood of collision. In this case, information may be displayed to the driver that may change color or frequency indicating a changing status. For instance, the color may be green when the vehicle is at a safe distance and/or an underride impact is not likely, and change to yellow/red when the likelihood of collision increases, or the gap between the vehicle and target vehicle decreases.

In some examples, the impact action may include automatically applying the brakes. A severity or strength of the application of brakes may depend on the closing speed, distance, speed and heading of vehicle 100 and/or target vehicle 140/300, or other metrics.

In some examples, the impact action may include transmitting a signal. The signal may be transmitted to the target vehicle via vehicle-to-vehicle communication. The signal may also or alternatively be transmitted to one or more vehicles nearby, and/or one or more emergency vehicles or systems. The signal may indicate that an underride impact is predicted or imminent.

The signal may alternatively indicate that the target vehicle underride protection is inadequate or undeployed. In some examples, the underride system may detect the presence or absence of an underride guard on the target vehicle, either through one or more sensors or via images captured by the camera. The signal may indicate to that an underride guard is expected, but that none is detected, or the detected underride guard is inadequate or in the wrong location.

In some examples, the impact action may include modifying a collision system of vehicle 100. Modifying the collision system may include changing which airbags get deployed upon detection of an impact. Modifying the collision system may also include changing a timing for which the airbags deploy. For instance, one or more airbags may ordinary deploy after a delay or upon detection of an impact based on a crash sensor in a bumper of vehicle 100. However the collision system may be modified such that one or more airbags may be deployed earlier, or may be deployed based on a signal other than the crash sensor, such as based on analysis of images captured by the camera.

Further, modifying the collision system may include using the camera to activate safety measures instead of a crash sensor. Many underride impacts are particularly dangerous because a crash sensor on the bumper of the vehicle may not be tripped or activated where the initial impact is with the windshield or upper part of the vehicle. As such, images from the camera may indicate that an underride impact is going to occur before the impact is sensed by a crash sensor. The collision system may take appropriate countermeasures in a timely manner based on the camera images instead of the (inactivated) crash sensor.

The vehicle underride system may also include estimating an underride impact energy, and responsively taking action. The impact energy may be estimated based on known metrics of the vehicle 100, detected or estimated metrics of the target vehicle, and the various distances, speeds, and headings of the two vehicles. Then based on this estimated impact energy, one or more collision system features may be activated or modified. For instance, where the impact energy is estimated to be very high, the airbags may be set to go off faster or earlier, and the seat belts may be set to restrain the passengers more quickly. Other changes are possible as well.

Figure 4:
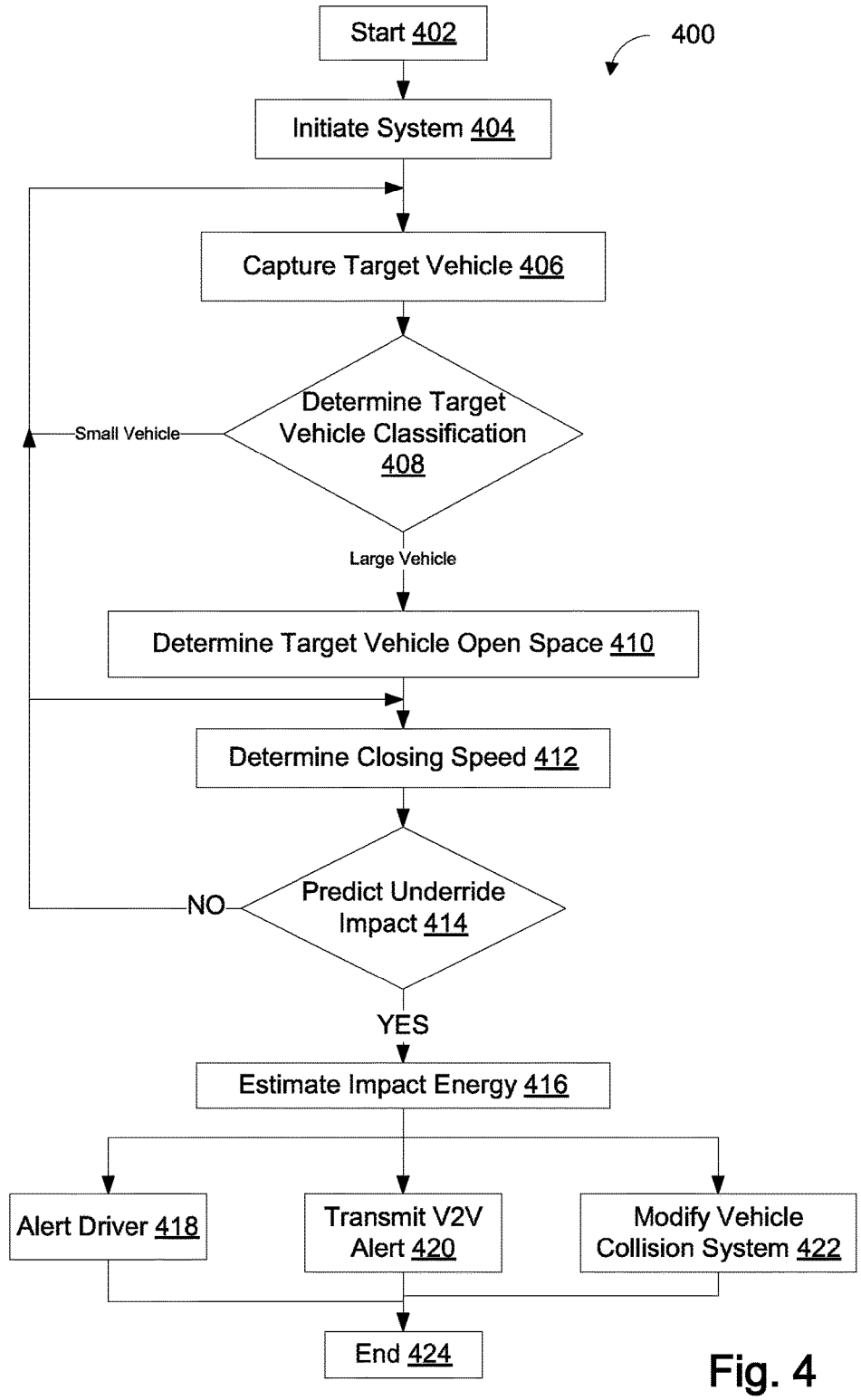
FIG. 4 illustrates a flowchart of an example method according to embodiments of the present disclosure.

FIG. 4 illustrates a flowchart of an example method 400 according to embodiments of the present disclosure. Method 400 may enable one or more systems to detect or predict an underride impact, and take appropriate action. The flowchart of FIG. 4 is representative of machine readable instructions that are stored in memory (such as memory 212) and may include one or more programs which, when executed by a processor (such as processor 210) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, the method may include initiating the system. Initiating the system may include generating or retrieving information relating to the vehicle dimensions, size, weight, etc.

At block 406, method 400 may include capturing the target vehicle. As described above, this may be done by a forward facing camera mounted to the vehicle. It may also include determining which one of several vehicles in a field of view of the camera is the target vehicle.

At block 408, method 400 may include determining a target vehicle classification. Method 400 is described for classifications including small, and large vehicles. However, it should be noted that other classifications are possible as well. FIG. 4 shows that where the target vehicle is classified as a small vehicle, method 400 may return to block 406 to capture a new target vehicle that may enter the camera field of view. This may be because a collision between the vehicle and the small target vehicle will not result in an underride impact. But if the target vehicle is classified as a large vehicle (i.e., a vehicle with the potential for an underride impact), method 400 may proceed to block 410.

At block 410, method 400 may include determining one or more target vehicle open spaces. As described above, the open spaces may be areas in which a collision may result in an underride impact. This may include the area underneath the lower edge of the target vehicle, an area between tires of the target vehicle, and more.

At block 412, method 400 may include determining a closing speed between the vehicle and the target vehicle. This may also include determining a distance between the vehicles, as well as various other metrics relating to the vehicle and the target vehicle.

At block 414, method 400 may include predicting an underride impact. This prediction may be based on information received from various vehicle sensors, as well as the determined classification, open spaces, and closing speed. If no underride impact is predicted, method 400 may proceed back to block 412 in which the closing speed (and/or distance) are determined. This may allow the system to monitor the distance and speed between the vehicles, such that an accident may be avoided or mitigated. Alternatively, if no underride impact is predicted, method 400 may proceed back to block 406 in which a new target vehicle is captured.

But if an underride impact is predicted, block 416 may include estimating an impact energy. The estimated impact energy may affect one or more actions taken by the collision system of the vehicle. For instance, a higher impact energy may cause airbags, seat belt restraints, or other systems to operate differently than for a low estimated impact energy.

At block 418, method 400 may include alerting a driver of the vehicle. The alert may be audio, visual, and/or may update the driver periodically. Method 400 may then end at block 424. At block 420, method 400 may include transmitting a vehicle-to-vehicle (V2V) alert. This alert may be sent to the target vehicle to alert the target vehicle driver of a predicted impact, or to one or more nearby vehicles, emergency vehicles, or other computing devices. The alert may also include information such as location, speed, and/or indicate that the target vehicle underride guard is not in place or inadequate. Subsequent to block 420, method 400 may end at block 424.

At block 422, method 400 may include modifying the vehicle collision system. As discussed above, this may include changing the timing or activation of one or more vehicle restraints (e.g., airbags and seat belts), and/or using images from the camera to activate one or more safety features instead of a crash sensor. Method 400 may then end at block 424.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a camera for capturing an image of a target vehicle;
    sensors for detecting a speed and heading of the vehicle; and
    a processor configured to:
        determine a target vehicle classification;
        determine an open space of the target vehicle;
        responsive to determining the target vehicle classification as a semi-truck, determine a boundary of the open space without considering an underride guard of the target vehicle as the boundary of the open space;
        determine a closing speed between the vehicle and target vehicle;
        predict an underride impact based on the classification, open space, and closing speed; and
        responsively execute an impact action.

2. The vehicle of claim 1, wherein the camera is a forward facing camera coupled to a rear view mirror of the vehicle.

3. The vehicle of claim 1, wherein the target vehicle classification is determined based on the image of the target vehicle captured by the camera.

4. The vehicle of claim 1, wherein the open space of the target vehicle is determined based on the image of the target vehicle captured by the camera.

5. The vehicle of claim 4, wherein the open space comprises an area extending from a base of the target vehicle to a ground, and from a first target vehicle wheel to a second target vehicle wheel.

6. The vehicle of claim 1, wherein determining the closing speed comprises:
    determining a speed and heading of the target vehicle;
    comparing the determined speed and heading of the vehicle and the target vehicle; and
    responsively determining the closing speed.

7. The vehicle of claim 1, wherein the impact action comprises:
    alerting a driver of the vehicle of an imminent underride collision.

8. The vehicle of claim 1, wherein the impact action comprises transmitting a signal from the vehicle to the target vehicle.

9. The vehicle of claim 8, wherein the signal indicates an underride collision is predicted.

10. The vehicle of claim 1, wherein the impact action comprises modifying a collision system of the vehicle.

11. The vehicle of claim 10, wherein modifying the collision system of the vehicle comprises changing which airbag(s) are activated upon detection of a crash.

12. The vehicle of claim 10, wherein a modified collision system is configured to:
    determine that a crash has occurred based on one or more images captured by the camera; and
    responsively activate a vehicle restraint.

13. The vehicle of claim 1, wherein the processor is further configured to:
    estimate an underride impact energy; and
    responsively execute the impact action based on the underride impact energy.

14. The vehicle of claim 1, wherein the processor is further configured to, responsive to determining the target vehicle classification as a semi-truck, determining the boundary of the open space without considering at least one physical object disposed between front wheels of a tractor unit of the semi-truck and rear wheels of the tractor unit of the semi-truck as the boundary of the open space.

15. The vehicle of claim 14, wherein the at least one physical object comprises a fuel tank.

16. A method comprising:
    capturing a target vehicle image with a camera of a vehicle;

detecting a speed and heading of the vehicle;
determining a target vehicle classification;
determining an open space of the target vehicle;
responsive to determining the target vehicle classification as a semi-truck, determining a boundary of the open space without considering an underride guard of the target vehicle as the boundary of the open space;
determining a closing speed between the vehicle and the target vehicle;
predicting an underride impact based on the classification, open space, and closing speed; and
responsively executing an impact action.

17. The method of claim 16, wherein the target vehicle classification is determined based on the target vehicle image.

18. The method of claim 16, wherein the open space of the target vehicle is determined based on the target vehicle image, and wherein the open space comprises an area extending from a base of the target vehicle to the ground, and from a first target vehicle wheel to a second target vehicle wheel.

19. The method of claim 16, wherein the impact action comprises transmitting a signal from the vehicle to the target vehicle indicating an underride collision is predicted.

20. The method of claim 16, further comprising:
estimating an underride impact energy; and
responsively executing the impact action based on the underride impact energy.

* * * * *